US012000407B1

(12) United States Patent
Hsieh et al.

(10) Patent No.: US 12,000,407 B1
(45) Date of Patent: Jun. 4, 2024

(54) CEILING FAN BLADE ASSEMBLY STRUCTURE

(71) Applicant: HOTECK INC., Taichung (TW)

(72) Inventors: Lung-Fa Hsieh, Taichung (TW); Yu-Chen Hsieh, Taichung (TW); Min-Yuan Hsiao, Taichung (TW); Wen-Ting Tang, Taichung (TW); Hsin-Chu Chang, Taichung (TW); Ying-Pin Chiang, Taichung (TW)

(73) Assignee: HOTECK INC., Taichung (TW)

( * ) Notice: Subject to any disclaimer, the term of this patent is extended or adjusted under 35 U.S.C. 154(b) by 0 days.

(21) Appl. No.: 18/352,222

(22) Filed: Jul. 13, 2023

(30) Foreign Application Priority Data

Apr. 17, 2023 (TW) ................................ 112203486

(51) Int. Cl.
*F04D 25/08* (2006.01)
*F04D 29/34* (2006.01)

(52) U.S. Cl.
CPC ........... *F04D 29/34* (2013.01); *F04D 25/088* (2013.01); *F05D 2260/31* (2013.01); *F05D 2260/36* (2013.01)

(58) Field of Classification Search
CPC ...... F04D 25/08; F04D 25/088; F04D 29/329; F04D 29/34; F04D 29/322; F05D 2260/31; F05D 2260/36
See application file for complete search history.

(56) References Cited

U.S. PATENT DOCUMENTS 6,347,924 B1 * 2/2002 Chang ..................... F04D 29/34 416/221
6,726,453 B1 * 4/2004 Hsieh .................... F04D 25/088 416/207
8,668,451 B2 * 3/2014 Haynes ................. F04D 25/088 416/207
9,651,058 B1 * 5/2017 Mares ..................... F04D 29/34
11,371,518 B2 * 6/2022 Hsieh .................. F04D 25/0613
2008/0273979 A1 * 11/2008 Bucher ................... F04D 29/34 416/210 R
2009/0004015 A1 * 1/2009 Wang .................... F04D 25/088 416/210 R (Continued)

*Primary Examiner* — Brian P Wolcott
*Assistant Examiner* — Maxime M Adjagbe
(74) *Attorney, Agent, or Firm* — Li & Cai Intellectual Property Office

(57) ABSTRACT

A ceiling fan blade assembly structure includes a blade holder, multiple fan blades, and multiple locking assemblies. Multiple fan blade assembly portions are disposed at an outer side of the blade holder. Each fan blade assembly portion includes two first side plates parallel to each other, a first radial positioning portion, and two first vertical positioning portions disposed on the two first side plates. Each fan blade has a fan blade connection portion that includes two second side plates, a second radial positioning portion, and two second vertical positioning portions. The second and the first radial positioning portions are engaged with each other, and the two second and first vertical positioning portions are engaged with each other. Accordingly, the fan blade connection portion is preliminarily positioned on the fan blade assembly portion. Through the locking assembly, the first and the second radial positioning portions are locked together.

13 Claims, 10 Drawing Sheets

(56) References Cited

U.S. PATENT DOCUMENTS

| | | | | |
|---|---|---|---|---|
| 2009/0246028 | A1* | 10/2009 | Richardson | F04D 29/34 416/210 R |
| 2010/0150722 | A1* | 6/2010 | Tseng | F04D 25/02 416/246 |
| 2017/0037869 | A1* | 2/2017 | Zauhar | F04D 25/088 |
| 2019/0390684 | A1* | 12/2019 | Horng | F04D 29/34 |

* cited by examiner

CEILING FAN BLADE ASSEMBLY STRUCTURE

CROSS-REFERENCE TO RELATED PATENT APPLICATION

This application claims the benefit of priority to Taiwan Patent Application No. 112203486, filed on Apr. 17, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a ceiling fan blade assembly structure, and more particularly to a ceiling fan blade assembly structure used in a ceiling fan for air circulation.

BACKGROUND OF THE DISCLOSURE

In order to increase indoor ventilation, a ceiling fan is often installed indoors or in a public space for air circulation purposes. The existing ceiling fan includes a blade holder that is hung from a rooftop or a ceiling, a driving motor connected to the blade holder, a rotating hub that is driven by the driving motor, and a plurality of fan blades connected to the hub.

Conventionally, the fan blades are assembled to the hub only when the existing ceiling fan is being mounted to the rooftop. During assembly of the fan blades, two operators need to perform high-altitude operations, in which one of the operators supports the fan blades that are not yet assembled, and the other uses a fixing tool to fix the fan blades onto the ceiling fan. However, such an assembly method is not only time-consuming, but also prone to construction accidents with lack of good teamwork between the operators.

SUMMARY OF THE DISCLOSURE

In response to the above-referenced technical inadequacies, the present disclosure provides a ceiling fan blade assembly structure.

In order to solve the above-mentioned problems, one of the technical aspects adopted by the present disclosure is to provide a ceiling fan blade assembly structure, which includes a blade holder, a plurality of fan blades, and a plurality of locking assemblies. The blade holder includes a holder body and a plurality of fan blade assembly portions connected to an outer side of the holder body. A longitudinal axis direction that is parallel to a radial direction of the blade holder, a horizontal axis direction that is parallel to an orthogonal projection plane of the fan blade assembly portion and perpendicular to the longitudinal axis direction, and a vertical axis direction that is perpendicular to the orthogonal projection plane of the fan blade assembly portion are defined by each of the fan blade assembly portions. Each of the fan blade assembly portions includes two first side plates that are parallel to the longitudinal axis direction and extend above the fan blade assembly portion, a first radial positioning portion disposed between the two first side plates, and two first vertical positioning portions disposed on the two first side plates. The fan blades correspond in quantity to the fan blade assembly portions. Each of the fan blades has a fan blade connection portion disposed at a first end of the fan blade and a blade that is connected to the fan blade connection portion and extends toward a second end of the fan blade, and the first end is opposite to the second end. Each of the fan blade connection portions includes two second side plates that cooperate with the two first side plates, a second radial positioning portion, and two second vertical positioning portions. The second radial positioning portion is disposed on a bottom side of the fan blade connection portion, corresponds in position to the corresponding first radial positioning portion, and is complementary in shape to the first radial positioning portion. The two second vertical positioning portions correspond in position to and are engageable with the two first vertical positioning portions, respectively. The fan blade connection portions are configured to be assembled to the corresponding fan blade assembly portions by having the bottom side of the fan blade connection portion oriented toward the corresponding fan blade assembly portion, so that the two second side plates of the fan blade connection portion are located at inner sides of the two corresponding first side plates, and the second radial positioning portion is engaged with the corresponding first radial positioning portion. The two second vertical positioning portions are engageable with the corresponding first vertical positioning portions, so that the fan blade connection portion is unable to be displaced away from the corresponding fan blade assembly portion along the vertical axis direction. The first radial positioning portion and the corresponding second radial positioning portion have at least one first locking hole and at least one second locking hole that correspond in position to each other, respectively. After the second radial positioning portion and the corresponding first radial positioning portion are assembled, the locking assembly is used for being locked into the at least one corresponding second locking hole and the at least one corresponding first locking hole, so as to prevent separation of the second radial positioning portion from the corresponding first radial positioning portion.

Therefore, in the ceiling fan blade assembly structure provided by the present disclosure, by virtue of "each of the fan blade assembly portions including the two first side plates, the first radial positioning portion, and the two first vertical positioning portions disposed on the two first side plates," "each of the fan blades having the fan blade connection portion, and the fan blade connection portion including the two second side plates that cooperate with the two first side plates, the second radial positioning portion that cooperates with the first radial positioning portion, and the two second vertical positioning portions that cooperate with the two first vertical positioning portions," and "the locking assembly being used for locking together the first radial positioning portion and the second radial positioning portion that correspond to each other," the fan blade connection portion of the fan blade can be easily and preliminarily fixed to the corresponding fan blade assembly portion before the first radial positioning portion and the second radial positioning portion that correspond to each other are locked together through the locking assembly. In this way, the fan blades can be quickly and easily assembled to the blade holder.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
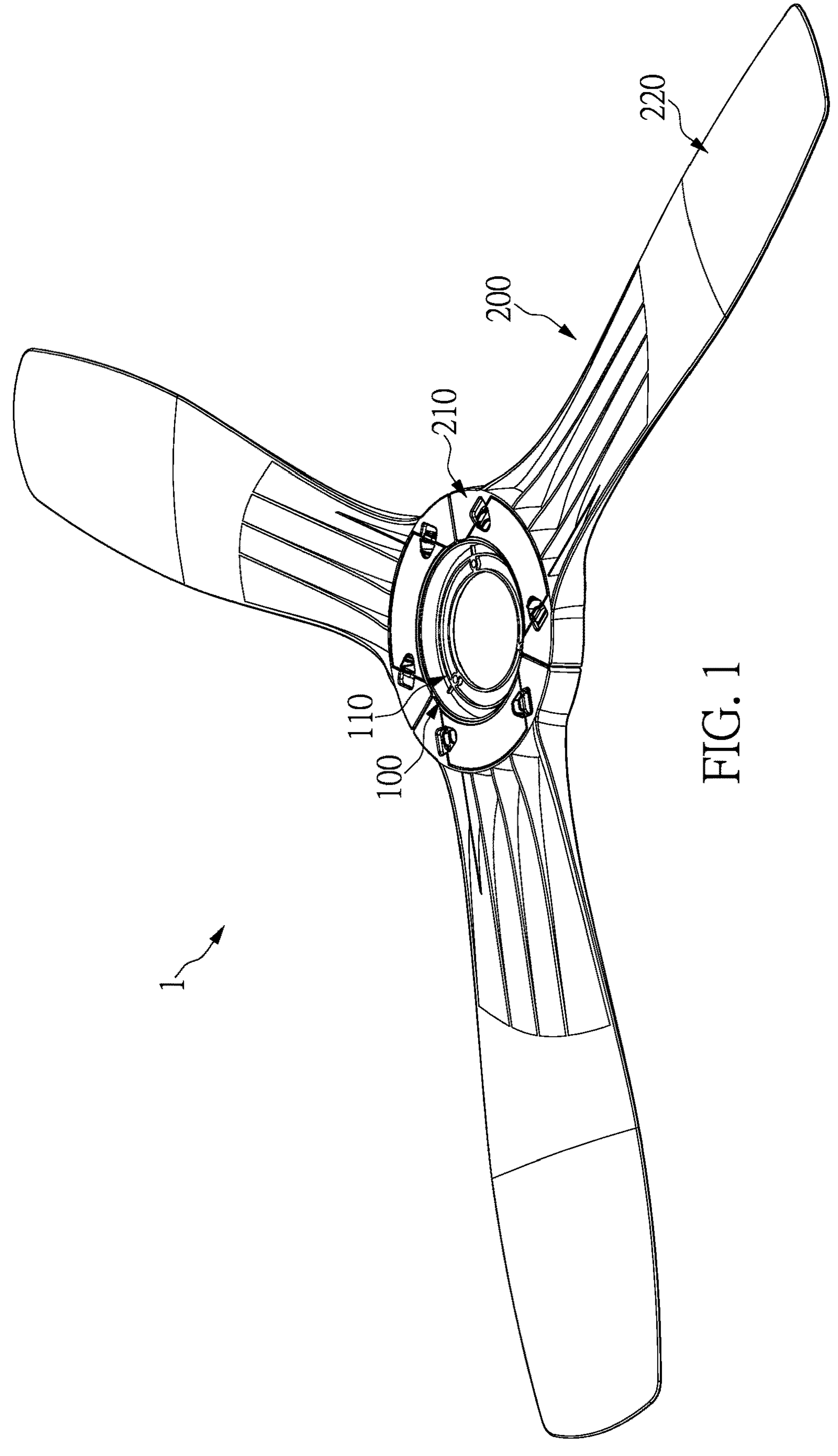
FIG. 1 is a schematic assembled perspective view of a ceiling fan blade assembly structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure provides a ceiling fan blade assembly structure 1. The ceiling fan blade assembly structure 1 includes a blade holder 100 and a plurality of fan blades 200 connected to the blade holder 100.

The blade holder 100 includes a holder body 110 and a plurality of fan blade assembly portions 120 connected to an outer side of the holder body 110. In the present embodiment, the holder body 110 includes a mounting portion 111 disposed on a bottom portion of the holder body 110 and a side wall 112 that surrounds an outer periphery of the mounting portion 111 in 360 degrees. The holder body 110 is used for being connected to a hub or a motor (not shown in the drawings), so that the ceiling fan blade assembly structure 1 can be connected to the hub or the motor.

Figure 2:
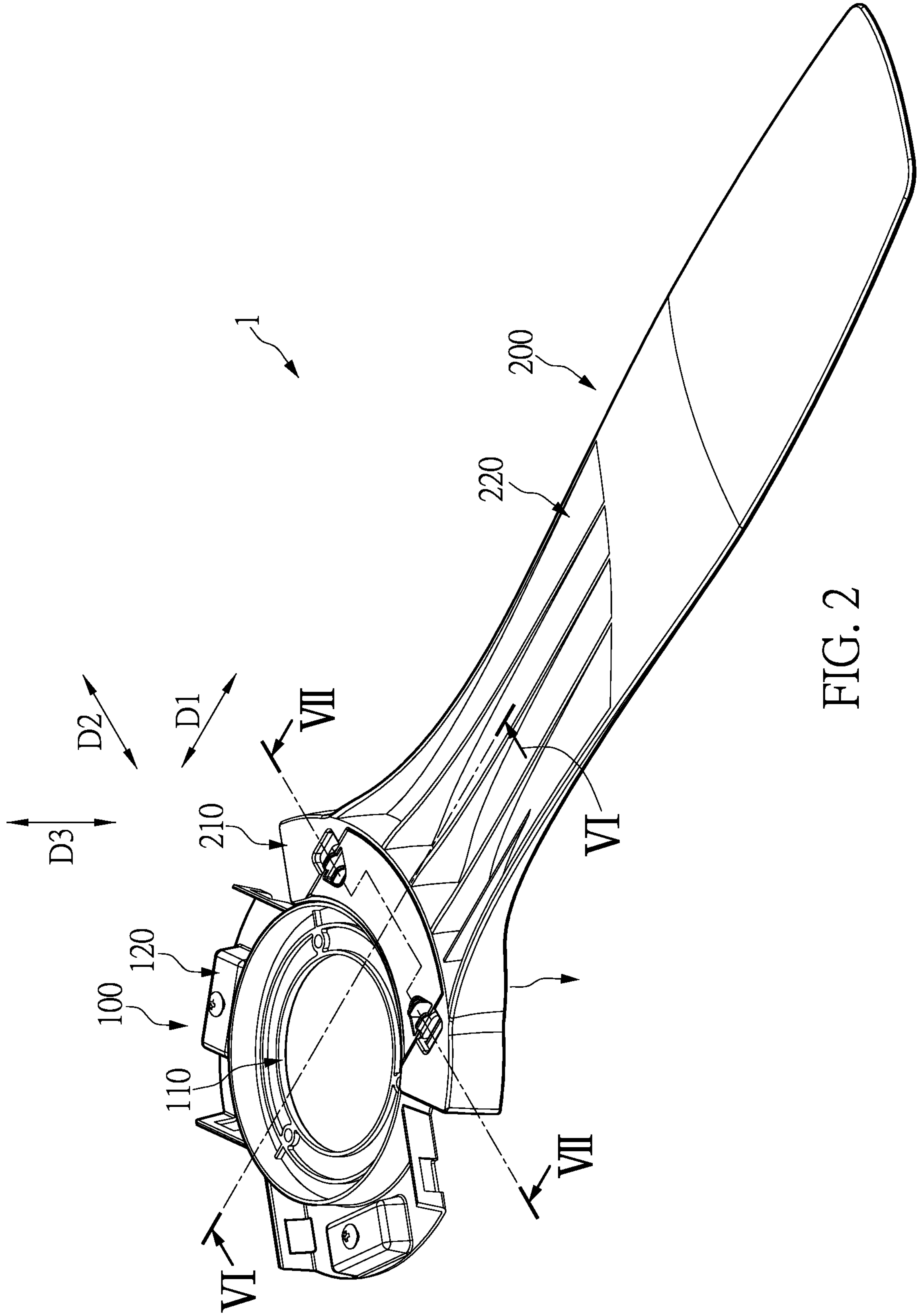
FIG. 2 is a schematic view showing an assembled state of a single fan blade and a blade holder of the ceiling fan blade assembly structure according to the first embodiment of the present disclosure.

The fan blade assembly portions 120 are surroundingly disposed at the outer side of the holder body 110. Each of the fan blade assembly portions 120 extends along a radial direction of the holder body 110, so that the fan blade assembly portions 120 are disposed at the outer side of the holder body 110 in a radial arrangement. For ease of illustration (as shown in FIG. 2), a longitudinal axis direction D1 that is parallel to a radial direction of the blade holder 100, a horizontal axis direction D2 that is parallel to an orthogonal projection plane of the fan blade assembly portion 120 and perpendicular to the longitudinal axis direction D1, and a vertical axis direction D3 that is perpendicular to the orthogonal projection plane of the fan blade assembly portion 120 are defined by each of the fan blade assembly portions 120.

Each of the fan blade assembly portions 120 includes two first side plates 122 that are parallel to the longitudinal axis direction D1 and extend above the fan blade assembly portion 120, a base plate 121 connected between bottom ends of the two first side plates 122, a first radial positioning portion 123 disposed between the two first side plates 122, and two first vertical positioning portions 124 disposed on the two first side plates 122.

The two first side plates 122 are bent upwardly from two sides of the base plate 121 along the horizontal axis direction D2, so that a groove that has an upward-facing opening and extends along the longitudinal axis direction D1 is jointly defined by the two first side plates 122 and the base plate 121. The groove can be used for joining with the fan blade connection portion 210 of any of the fan blades 200. It should be noted that, since rib portions that are located at the two sides of the base plate 121 and protrude upwardly are formed by the two first side plates 122, and the two first side plates 122 and the base plate 121 are integrally connected to the side wall 112 toward an end of the holder body 110, the fan blade assembly portion 120 has a good flexural strength along the longitudinal axis direction D1, and is capable of carrying a weight of the fan blade 200.

The first radial positioning portion 123 of each of the fan blade assembly portions 120 is disposed between the two first side plates 122 on the base plate 121, and protrudes above the base plate 121. In the present embodiment, the first radial positioning portion 123 has a top wall 1231 that is substantially parallel to the base plate 121 and a plurality of side walls 1232 that are connected to an outer periphery of the top wall 1231 and extend downwardly to be connected to the base plate 121.

In the present embodiment, a length of the first radial positioning portion 123 along the longitudinal axis direction D1 is configured to be less than a width of the first radial positioning portion 123 along the horizontal axis direction D2. As such, the width of the first radial positioning portion 123 is greater than the length of the first radial positioning portion 123, and the shape of the first radial positioning portion 123 is substantially a rectangular protrusion. More specifically, in the present embodiment, the width of the first radial positioning portion 123 along the horizontal axis direction D2 ranges between one-third and three-fourths of a width of the base plate 121, and the length of the first radial positioning portion 123 along the longitudinal axis direction D1 is not less than one-fourth of the width of the first radial positioning portion 123 along the horizontal axis direction D2. In addition, on the projection plane of the corresponding fan blade assembly portion 120, an area of an upper end of the first radial positioning portion 123 is configured to be smaller than an area of a bottom end of the first radial positioning portion 123. In the first radial positioning portion 123, an arc chamfer is formed at a junction between the outer periphery of the top wall 1231 and the side walls 1232.

Through the above configuration, the shape of the first radial positioning portion 123 in the present embodiment is a trapezoid having a width that is greater than a length, and an area that is wide at the bottom and narrow at the top. Further, the first radial positioning portion 123 is a protrusion that has the arc chamfer at an edge of its upper end. Due to such a shape, the first radial positioning portion 123 can be easily assembled to a cooperating structure of the corresponding fan blade 200.

In the present embodiment, the two first vertical positioning portions 124 of each of the fan blade assembly portions 120 are disposed on the two first side plates 122, respectively. Each of the first vertical positioning portions 124 has a first opening 1241 formed on the corresponding first side plate 122, and an upper edge is formed above the first opening 1241.

It should be noted that the blade holder 100 of the present embodiment may be a one-piece structure that is integrally formed, but the present disclosure is not limited thereto. In other embodiments (not shown in the drawings), the blade holder 100 can also be an assembled structure. For example, the holder body 110 can be divided into a plurality of assembling parts according to a quantity of the fan blades 200, and each of the assembling parts of the holder body 110 has the fan blade assembly portion 120. The assembling parts of the holder body 110 can be fixed to the hub or the motor, so as to be assembled into the complete blade holder 100.

In the following description, technical features of the fan blades 200 of the ceiling fan blade assembly structure 1 will be illustrated. As shown from FIG. 1 to FIG. 3, a first end and a second end that are opposite to each other can be defined on each of the fan blades 200 along the longitudinal axis direction D1 of the corresponding fan blade assembly portion 120. Each of the fan blades 200 has a fan blade connection portion 210 disposed at the first end thereof and a blade 220 that is connected to the fan blade connection portion 210 and extends toward the second end thereof. Through the fan blade connection portion 210, each of the fan blades 200 is assembled to the corresponding fan blade assembly portion 120, so that the fan blades 200 are assembled to the blade holder 100.

Figure 3:
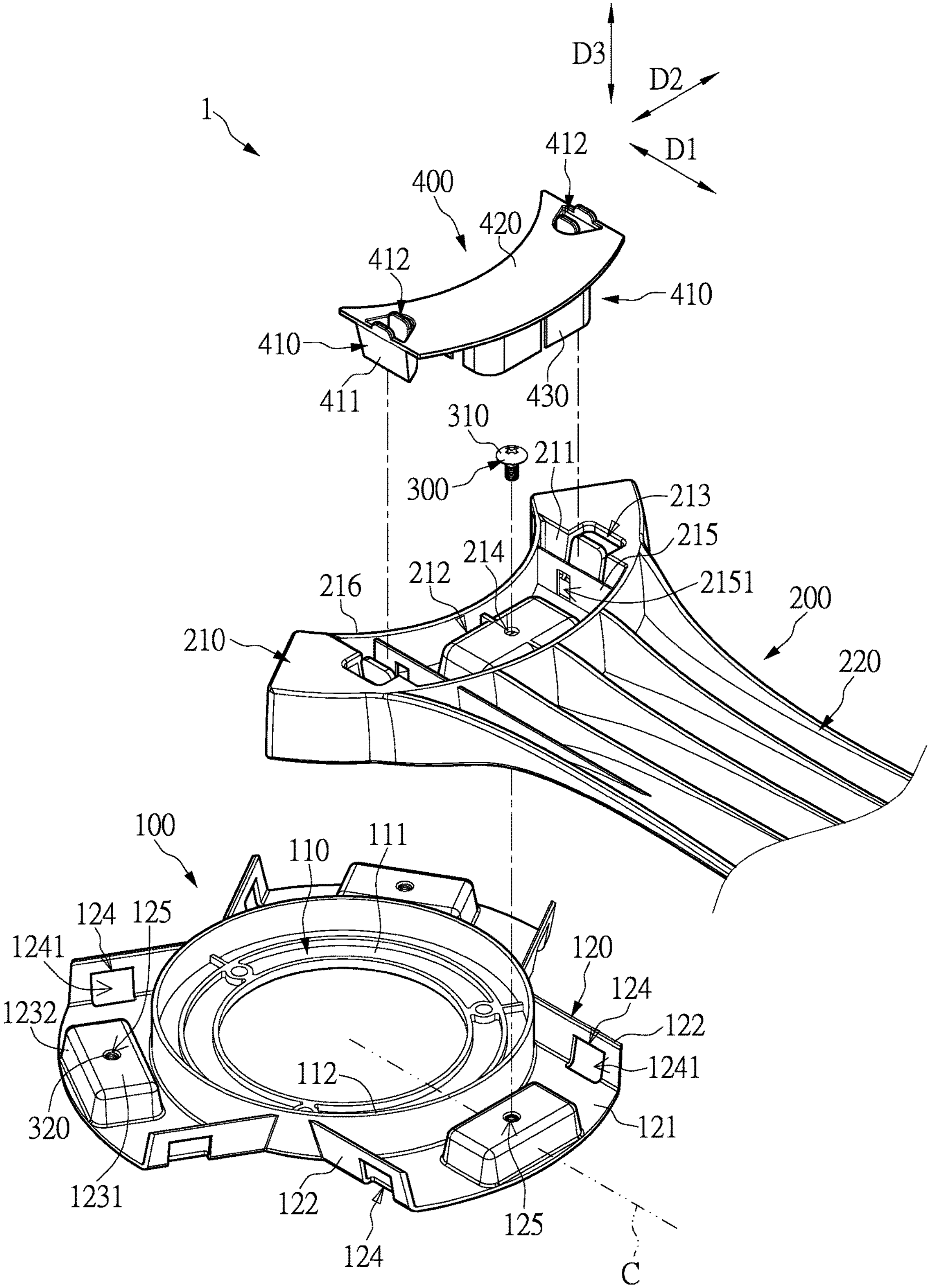
FIG. 3 is a partial schematic exploded perspective view of the ceiling fan blade assembly structure according to the first embodiment of the present disclosure.
Figure 4:
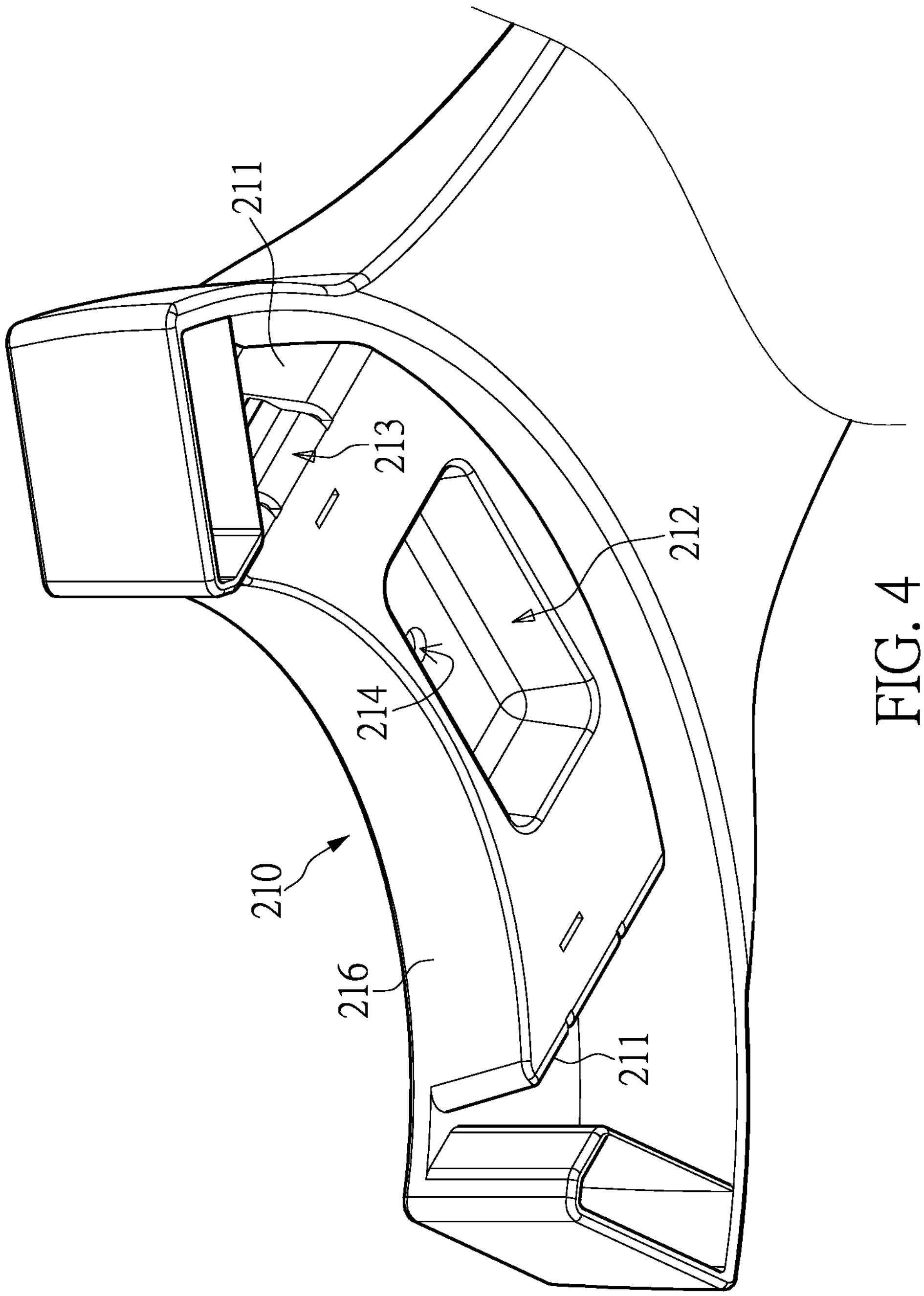
FIG. 4 is a partially-enlarged schematic perspective view of a fan blade connection portion taken from a bottom direction according to the first embodiment of the present disclosure.

As shown in FIG. 3 and FIG. 4, each of the fan blade connection portions 210 is configured to be assembled to the corresponding fan blade assembly portion 120 along the vertical axis direction D3 by having its bottom surface oriented toward the corresponding fan blade assembly portion 120. In the present embodiment, each of the fan blade connection portions 210 includes two second side plates 211, a second radial positioning portion 212 disposed on a bottom side of the fan blade connection portion 210, two second vertical positioning portions 213 disposed at two sides of the fan blade connection portion 210, and a front edge 216 that is disposed at an end of the fan blade connection portion 210 toward the blade holder 100 and matches in shape with the side wall 112.

As shown in FIG. 4, a bottom portion of the fan blade connection portion 210 is substantially complementary in shape to the groove jointly defined by the two first side plates 122 and the base plate 121 of the corresponding fan blade assembly portion 120. The two second side plates 211 are formed at the two sides of the fan blade connection portion 210, and a width of outer side walls of the two second side plates 211 substantially matches with a pitch of inner side walls of the two first side plates 122 of the corresponding fan blade assembly portion 120. As such, when the fan blade connection portion 210 is assembled to the corresponding fan blade assembly portion 120, a relative displacement between the fan blade connection portion 210 and the fan blade assembly portion 120 along the horizontal axis direction D2 does not occur.

The second radial positioning portion 212 is disposed on the bottom side of the fan blade connection portion 210, and corresponds in position to the corresponding first radial positioning portion 123. Furthermore, the second radial positioning portion 212 substantially has a groove shape that is complementary to the shape of the first radial positioning portion 123, thereby allowing the second radial positioning portion 212 to be engaged with the corresponding first radial positioning portion 123 along the vertical axis direction D3. In this way, a relative displacement between the fan blade connection portion 210 and the corresponding fan blade assembly portion 120 along the longitudinal axis direction D1 does not occur.

Figure 7:
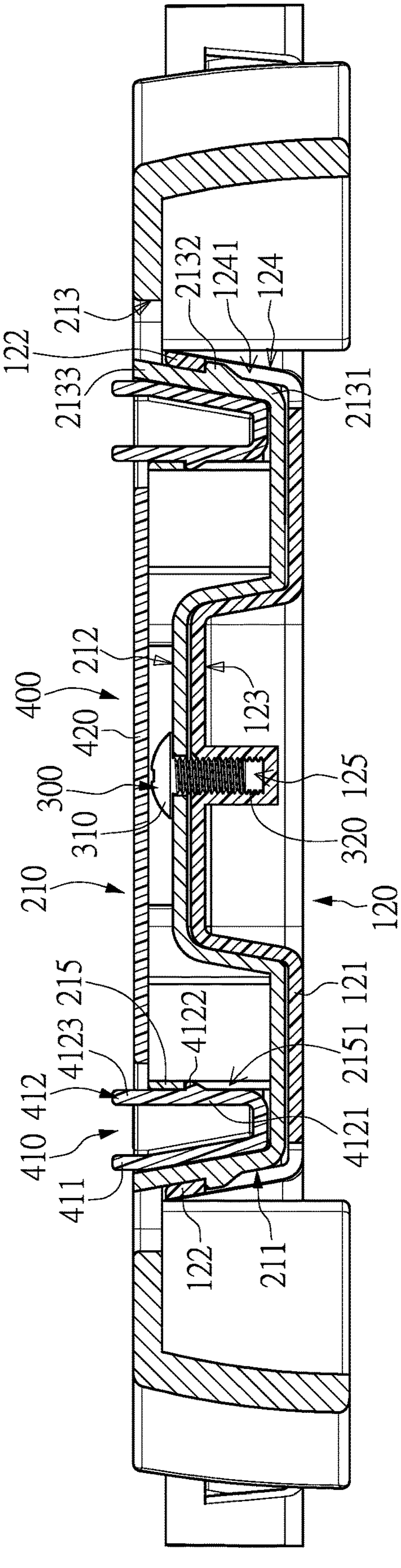
FIG. 7 is a partial schematic assembled cross-sectional view of the ceiling fan blade assembly structure taken along line VII-VII of FIG. 2.

Referring to FIG. 4 and FIG. 7, the two second vertical positioning portions 213 are disposed at positions of the two second side plates 211 that correspond to the two first vertical positioning portions 124 of the corresponding fan blade assembly portion 120. In the present embodiment, the two second vertical positioning portions 213 each include a first elastic sheet 2131 that corresponds to the corresponding first vertical positioning portion 124, and a first hook 2132 that is disposed on the first elastic sheet 2131 and corresponds to the corresponding first opening 1241.

When the fan blade connection portion 210 is assembled to the corresponding fan blade assembly portion 120, the two first elastic sheets 2131 of the two second vertical positioning portions 213 are configured to approach inner sides of the two corresponding first side plates 122, and the two first hooks 2132 can enter the two corresponding first openings 1241 and be engaged with the upper edges of the corresponding first openings 1241 from bottom to top, so as to prevent a relative displacement between the fan blade connection portion 210 and the corresponding fan blade assembly portion 120 along the vertical axis direction D3.

Two first actuation portions 2133 are respectively formed at upper ends of the two first elastic sheets 2131, and the two first actuation portions 2133 are provided for an operator to actuate the two first elastic sheets 2131 with their fingers, so that the two first elastic sheets 2131 can be displaced away from the first side plates 122. In this way, the two second vertical positioning portions 213 can be separated from the corresponding first vertical positioning portions 124.

When the operator assembles each of the fan blades 200 to the blade holder 100, the fan blade connection portion 210 of the fan blade 200 is positioned to face the corresponding fan blade assembly portion 120 by its bottom surface, and then the two second side plates 211 of the fan blade connection portion 210 are aligned between the inner sides of the two first side plates 122 of the corresponding fan blade assembly portion 120 along an assembling path that is substantially parallel to the vertical axis direction D3. After the second radial positioning portion 212 is aligned with the corresponding first radial positioning portion 123, the fan blade connection portion 210 is engaged with the groove jointly defined by the two first side plates 122 and the base plate 121 of the corresponding fan blade assembly portion 120, so that the bottom portion of the fan blade connection portion 210 abuts against the base plate 121.

After the fan blade connection portion 210 is assembled to the corresponding fan blade assembly portion 120, the fan blade connection portion 210 can be preliminarily positioned on the corresponding fan blade assembly portion 120 through cooperation of the two first side plates 122 and the two second side plates 211 that correspond to each other, the first radial positioning portion 123 and the second radial positioning portion 212 that correspond to each other, and the two first vertical positioning portions 124 and the two second vertical positioning portions 213 that correspond to each other, so as not to be separated from the blade holder 100. Hence, during a process of assembling the fan blades 200 and the blade holder 100, the operator does not need to worry about the fan blades 200 dropping.

The ceiling fan blade assembly structure 1 further includes a plurality of locking assemblies 300. The locking assembly 300 is used for locking together the fan blade connection portion 210 and the corresponding fan blade assembly portion 120, so that the fan blade 200 can be stably assembled to the blade holder 100 and is not separated from the blade holder 100 during a fan rotating process.

Figure 6:
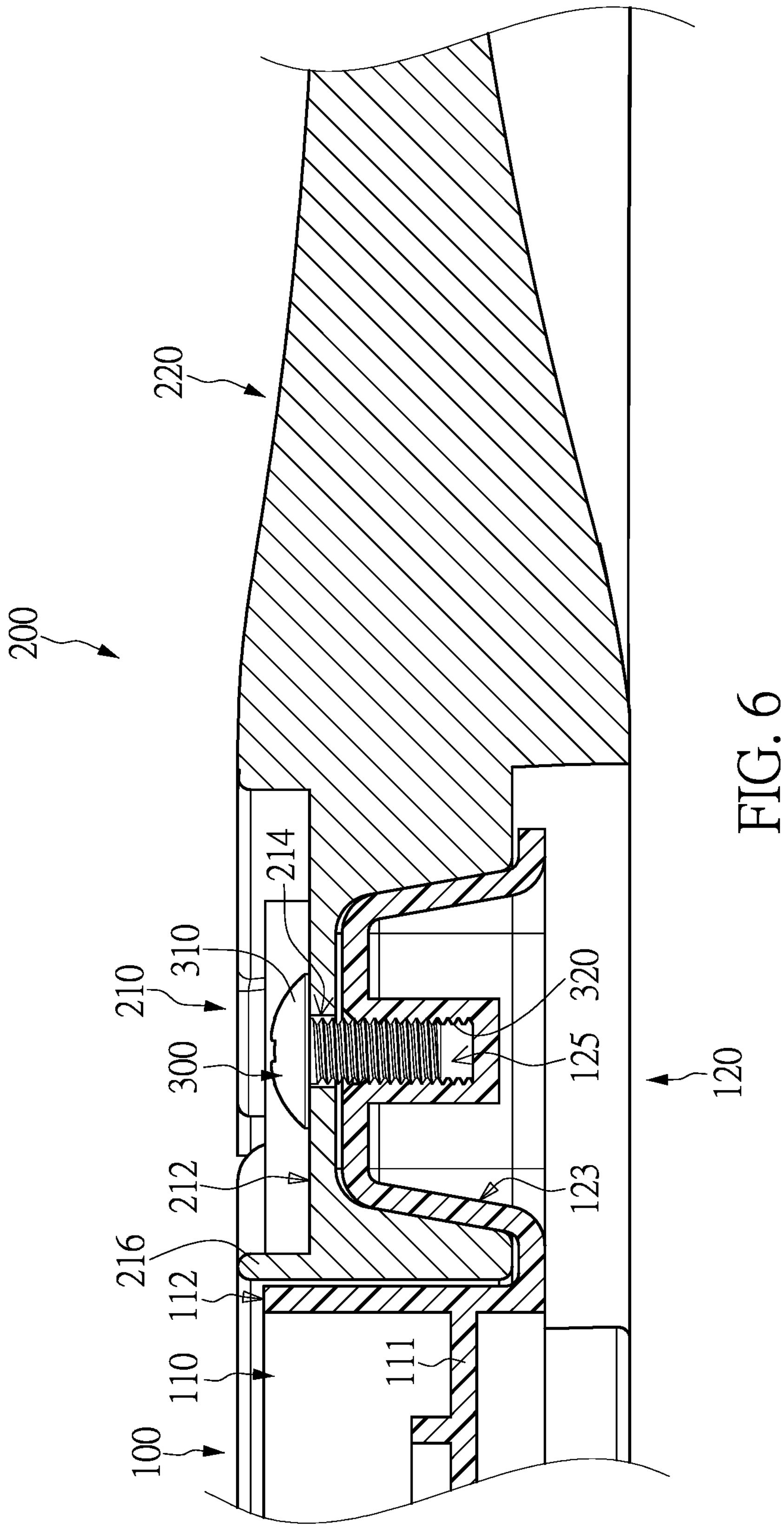
FIG. 6 is a partial schematic assembled cross-sectional view of the ceiling fan blade assembly structure taken along line VI-VI of FIG. 2.

Referring to FIG. 3, FIG. 6, and FIG. 7, through at least one of the locking assemblies 300, the first radial positioning portion 123 and the second radial positioning portion 212 that correspond to each other can be locked in the present embodiment. Furthermore, the top wall 1231 of the corresponding first radial positioning portion 123 has at least one first locking hole 125 that corresponds in quantity to the locking assemblies 300, and the corresponding second radial positioning portion 212 has at least one second locking hole 214 that corresponds in position to the at least one first locking hole 125. The locking assembly 300 is able to pass through the first locking hole 125 and the second locking hole 214 that correspond to each other, so as to lock together the first radial positioning portion 123 and the second radial positioning portion 212 that correspond to each other.

More specifically, the locking assembly 300 of the present embodiment includes at least one internal screw thread 320 and at least one screw 310. The internal screw thread 320 has an opening that corresponds to the first locking hole 125, and the screw 310 cooperates with the internal screw thread 320. In the present embodiment, the internal screw thread 320 is disposed at an inner side of a cylindrical sleeve below the first radial positioning portion 123, an opening of the cylindrical sleeve is aligned with the first locking hole 125, and a diameter of the internal screw thread 320 matches with the screw 310. After the fan blade connection portion 210 of the fan blade 200 is assembled to the corresponding fan blade assembly portion 120, the operator can insert the screw 310 through the second locking hole 214 and the corresponding first locking hole 125, so that the screw 310 is locked into the internal screw thread 320. In this way, the first radial positioning portion 123 and the second radial positioning portion 212 that correspond to each other can be locked together, so as to prevent separation of the second radial positioning portion 212 from the corresponding first radial positioning portion 123.

After the screw 310 passes through the second locking hole 214 and the first locking hole 125 that correspond to each other, and is locked into the internal screw thread 320, the corresponding fan blade 200 can be stably connected to the blade holder 100, so that the fan blade 200 is inseparable from the blade holder 100 during rotation of a fan. Moreover, in order for the operator to detach the fan blade 200 from the blade holder 100, it is necessary to first detach the corresponding locking assembly 300 for separation of the first vertical positioning portions 124 and the second vertical positioning portions 213 that correspond to each other and the first radial positioning portion 123 and the second radial positioning portion 212 that correspond to each other.

It should be noted that, in the present embodiment, a quantity of the locking assembly 300 used for each of the fan blade connection portions 210 and its corresponding fan blade assembly portion 120 is one. However, the present disclosure is not limited thereto. For example, the quantity of the locking assembly 300 can be more than two, and quantities of the first locking hole 125 and the second locking hole 214 formed on the first radial positioning portion 123 and the second radial positioning portion 212 can also be changed according to the quantity of the locking assembly 300.

As shown from FIG. 3 to FIG. 7, the ceiling fan blade assembly structure 1 of the present disclosure can further include an anti-separation assembly 400, and a structure that cooperates with the anti-separation assembly 400 is also disposed on the fan blade connection portion 210.

In each of the fan blade connection portions 210 of the present embodiment, two third side plates 215 that are spaced apart from the two second side plates 211 are disposed at inner sides of back surfaces of the two second vertical positioning portions 213 relative to the first vertical positioning portions 124. Two second openings 2151 are respectively formed on the two third side plates 215, the two second openings 2151 substantially correspond in position to the two first openings 1241, and an upper edge is formed above each of the second openings 2151.

Figure 5:
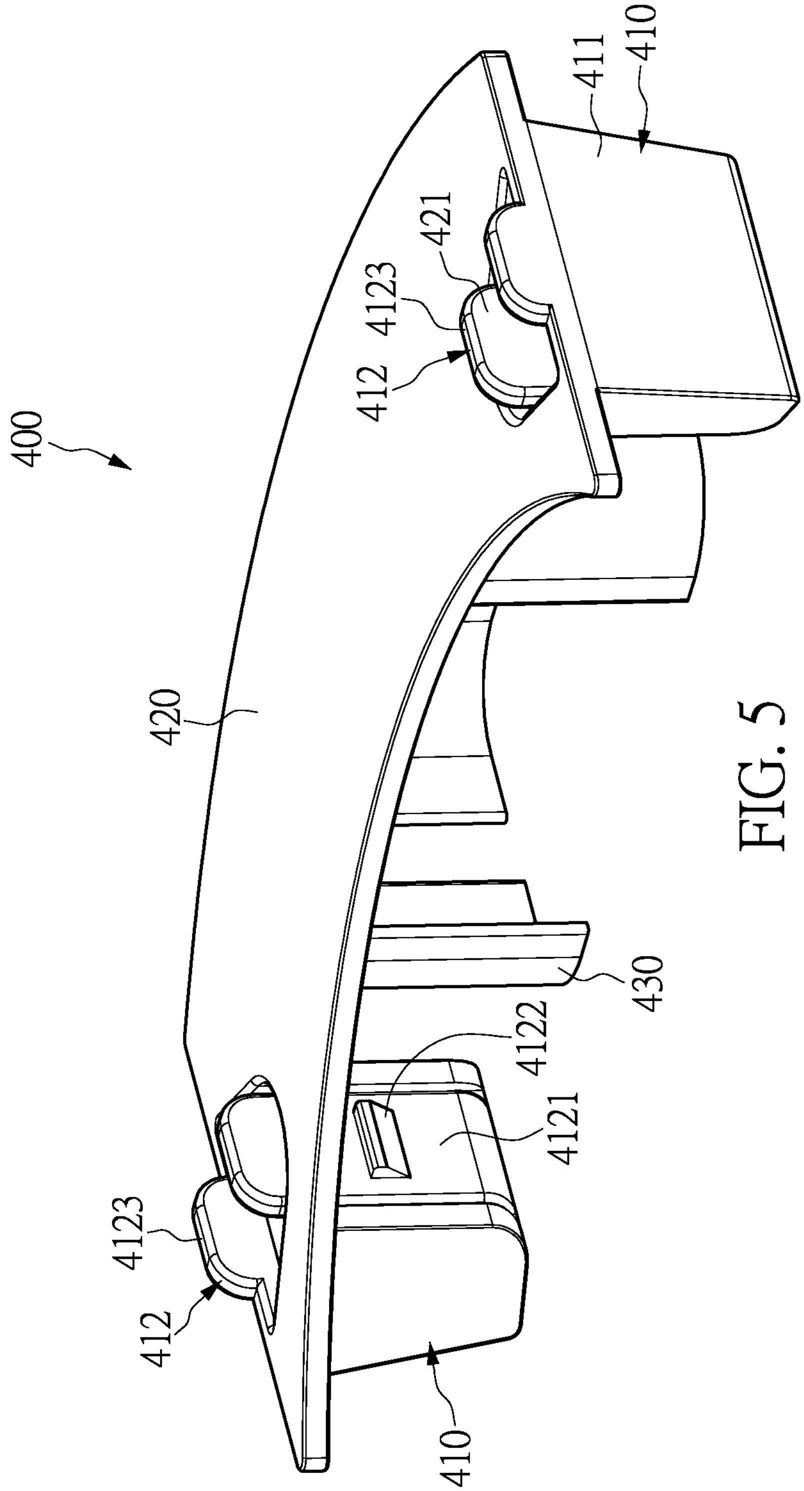
FIG. 5 is a schematic perspective view of an anti-separation assembly according to the first embodiment of the present disclosure.

As shown in FIG. 5 and FIG. 7, the anti-separation assembly 400 includes two insertion members 410, a connection plate 420 connected to upper ends of the two insertion members 410, and a sleeve portion 430 that is disposed on a bottom surface of the connection plate 420 and corresponds in position to the second radial positioning portion 212. Each of the insertion members 410 includes a blocking element 411 and a retention member 412 that is adjacent to the blocking element 411. The connection plate 420 is connected to the upper ends of the two insertion members 410, so that the two insertion members 410 are connected to each other through the connection plate 420. In addition, when the anti-separation assembly 400 is arranged on the corresponding fan blade connection portion 210, the connection plate 420 is located above the corresponding fan blade connection portion 210.

The insertion member 410 is able to be inserted into a gap between the third side plate 215 and the inner side of the back surface of the corresponding second vertical positioning portion 213 relative to the corresponding first side plate 122. After the insertion member 410 is inserted into the gap between the second vertical positioning portion 213 and the third side plate 215, a position of the blocking element 411 is adjacent to the corresponding second vertical positioning portion 213. In addition, a contact surface is formed on a side of the blocking element 411 that faces toward the back surface of the second vertical positioning portion 213, so as to abut against a back surface of the first elastic sheet 2131 of the corresponding second vertical positioning portion 213. Such configuration can prevent the corresponding first elastic sheet 2131 from being displaced away from the first opening 1241, thereby preventing separation of the second vertical positioning portion 213 from the corresponding first vertical positioning portion 124.

The retention member 412 is disposed at a side of the corresponding insertion member 410 that is adjacent to the corresponding third side plate 215, and corresponds in position to the corresponding second opening 2151. The retention member 412 includes a second elastic sheet 4121, a second hook 4122, and a second actuation portion 4123 formed at an upper end of the second elastic sheet 4121. The second hook 4122 is disposed on a side of the second elastic sheet 4121 that faces toward the corresponding second opening 2151, and protrudes toward the corresponding second opening 2151. When the insertion member 410 is inserted into the gap between the second vertical positioning portion 213 and the third side plate 215 that correspond to each other and reaches a predetermined position, the retention member 412 is configured to allow the second hook 4122 on the second elastic sheet 4121 to be aligned with and enter the corresponding second opening 2151, and to be engaged with the upper edge of the second opening 2151. In this way, an upward displacement of the insertion member 410 can be prevented, thereby fixing the anti-separation assembly 400 to the corresponding fan blade connection portion 210.

When the operator intends to detach the anti-separation assembly 400, the two second elastic sheets 4121 can be moved in a direction away from the corresponding third side plates 215 by actuating the second actuation portions 4123 of the two retention members 412. Accordingly, the two second elastic sheets 4121 are separated from the corresponding second openings 2151. Then, the two insertion members 410 are pulled up, so that the anti-separation assembly 400 is detached from the corresponding fan blade connection portion 210.

The anti-separation assembly 400 is capable of preventing separation of the two second vertical positioning portions 213 of the fan blade connection portion 210 and the two corresponding first vertical positioning portions 124. During rotation of the fan, if the corresponding locking assembly 300 of the fan blade 200 is accidentally damaged or falls off, it can still be ensured that the two second vertical positioning portions 213 and the two first vertical positioning portions 124 that correspond to each other remain in an engaged state. As such, the danger of dropping the fan blade 200 by accident can be prevented.

Second Embodiment

Figure 8:
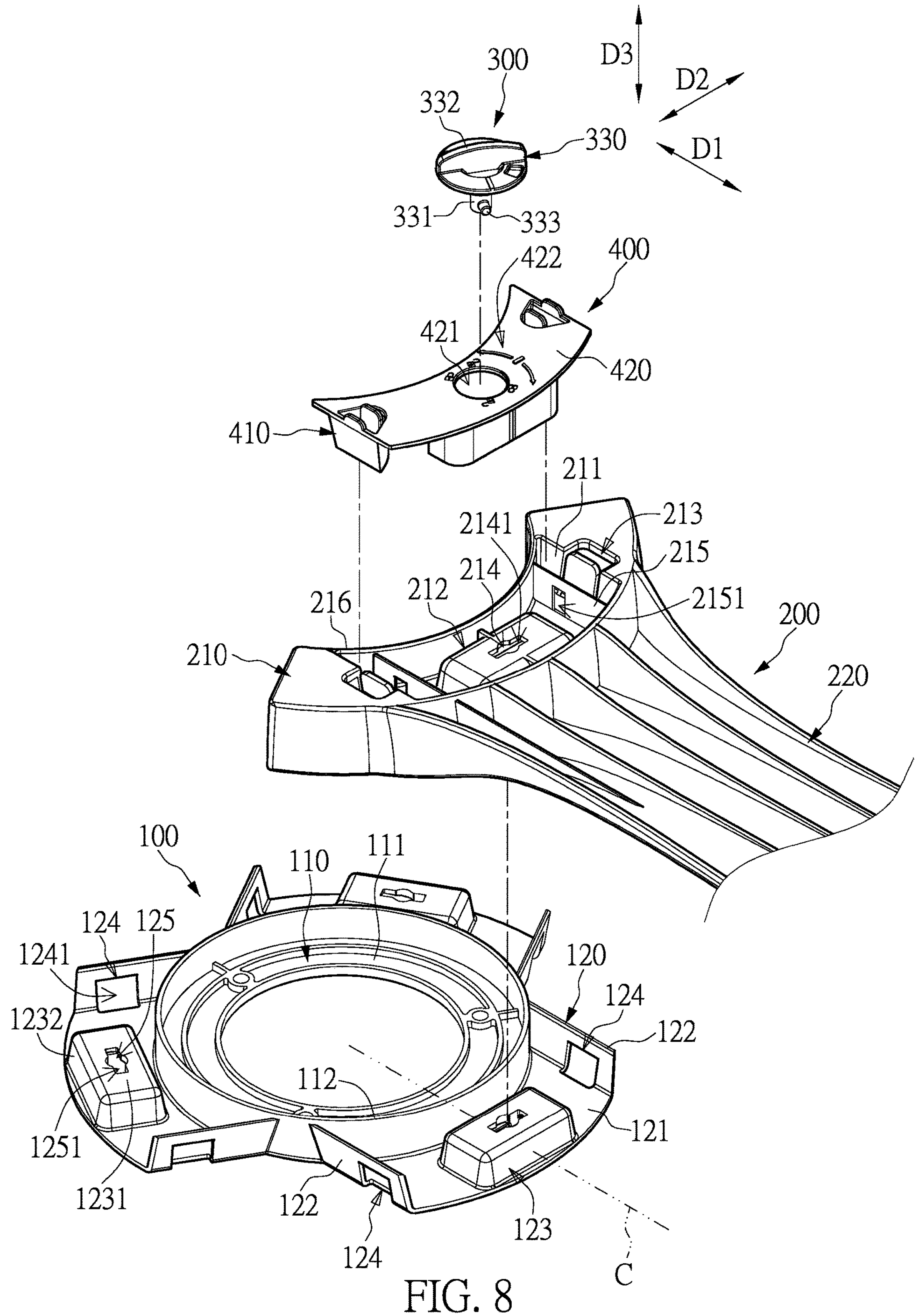
FIG. 8 is a partial schematic exploded perspective view of the ceiling fan blade assembly structure according to a second embodiment of the present disclosure.
Figure 9:
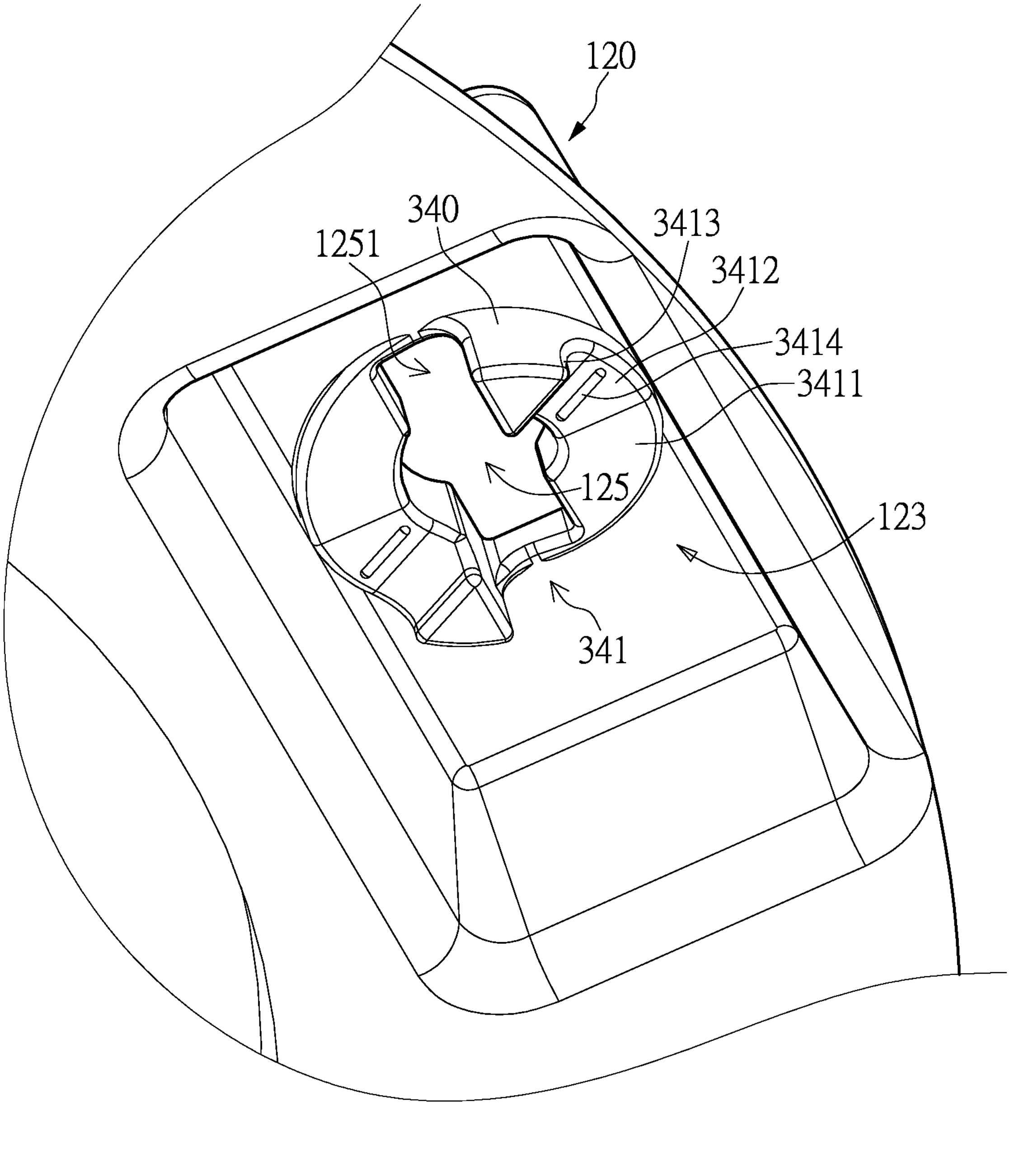
FIG. 9 is a partially-enlarged schematic perspective view of a fan blade assembly portion taken from the bottom direction according to the second embodiment of the present disclosure.
Figure 10:
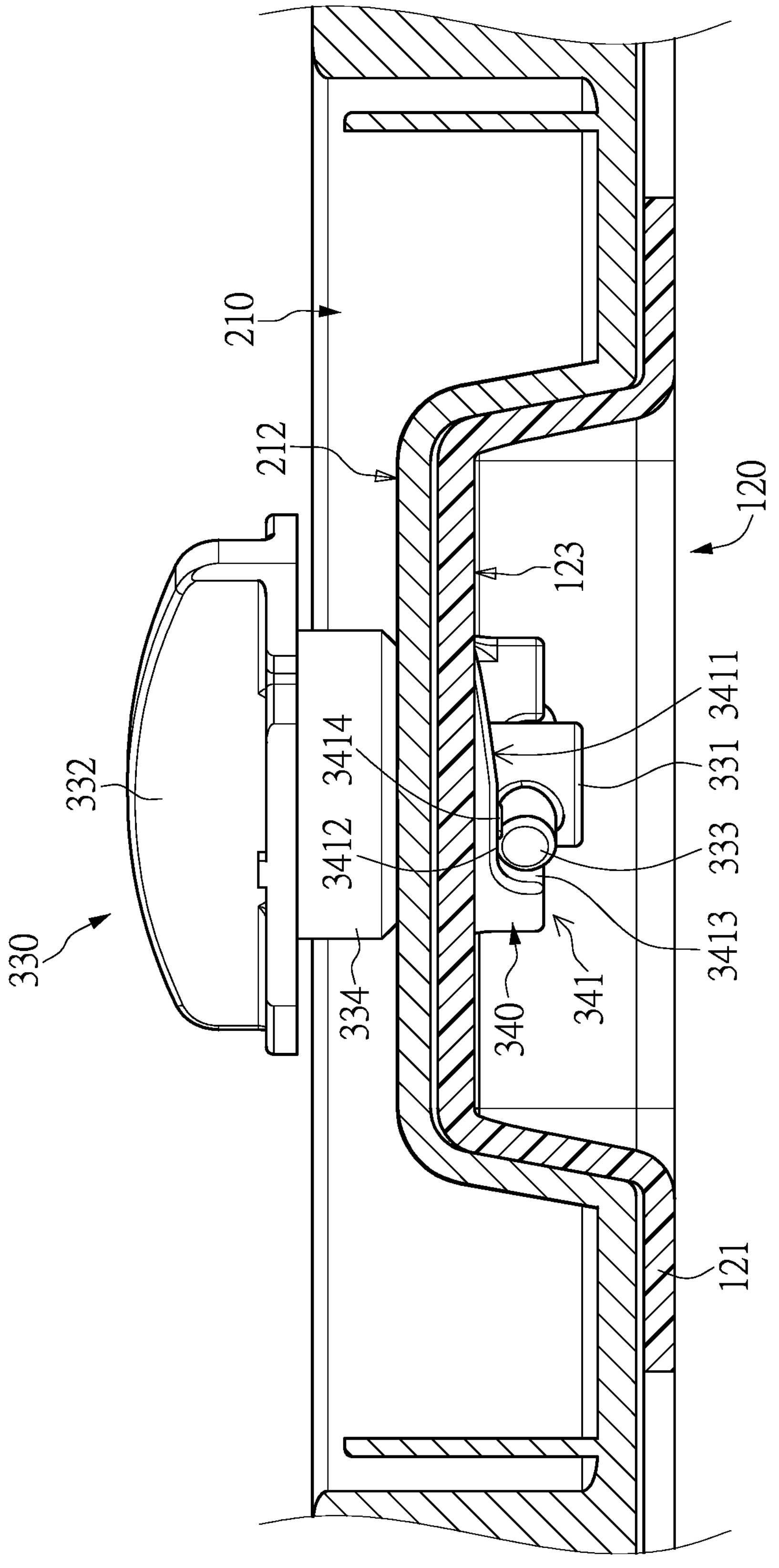
FIG. 10 is a partially-enlarged schematic assembled cross-sectional view of the ceiling fan blade assembly structure according to the second embodiment of the present disclosure.

Reference is made to FIG. 8 to FIG. 10, in which a second embodiment of the ceiling fan blade assembly structure 1 of the present disclosure is shown. It should be noted that since the essential structure and technical features of the present embodiment are similar to those of the first embodiment, the similarities therebetween will not be reiterated herein.

As shown in FIG. 8 and FIG. 9, after the fan blade connection portion 210 of each of the fan blades 200 is assembled to the corresponding fan blade assembly portion 120, at least one of the locking assemblies 300 can be used to lock the fan blade connection portion 210 and the corresponding fan blade assembly portion 120.

In the present embodiment, each of the locking assemblies 300 includes: a rotational locking member 330 that is able to pass through the corresponding first locking hole 125 and the corresponding second locking hole 214; and a locking seat 340 that is disposed on a bottom side of the corresponding first radial positioning portion 123 relative to the top wall 1231 and corresponds in position to the corresponding first locking hole 125.

The rotational locking member 330 includes a rotational shaft 331, a twist portion 332 disposed at a top end of the rotational shaft 331, at least two lateral protrusions 333 that are disposed at an outer side of a bottom end of the rotational shaft 331 and extend in a direction away from a center of the rotational shaft 331, and a press-contact portion 334 disposed below the twist portion 332.

Reference is made to FIG. 8 and FIG. 9. In the present embodiment, the shape of the first locking hole 125 and the second locking hole 214 matches with a transverse cross-sectional shape of the rotational shaft 331 of the rotational locking member 330 and the two lateral protrusions 333. Furthermore, apertures of the first locking hole 125 and the corresponding second locking hole 214 match with a diameter of the rotational shaft 331, at least two slots 1251 are formed on an outer side the first locking hole 125, and at least two slots 2141 that correspond to the at least two slots 1251 are formed on an outer side of the second locking hole 214. The two slots 1251 and the two slots 2141 correspond in position and shape to the two lateral protrusions 333 of the rotational locking member 330. When the two lateral protrusions 333 are aligned with the two slots 1251 of the first locking hole 125 and the two slots 2141 of the second locking hole 214 that correspond to each other, the rotational locking member 330 is able to pass through the first locking hole 125 and the second locking hole 214 that correspond to each other.

A center of the locking seat 340 is aligned with the corresponding first locking hole 125, and the first locking hole 125 and the two slots 1251 penetrate through a bottom surface of the locking seat 340. The bottom surface of the locking seat 340 has a bottom portion that surrounds an outer periphery of the first locking hole 125. The bottom portion of the locking seat 340 is configured to have at least two cam contact surfaces 341 that correspond in quantity to the at least two lateral protrusions 333. An initial end that is adjacent to the corresponding slot 1251 and a terminal end that is distant from the initial end can be defined on each of the cam contact surfaces 341.

As shown in FIG. 9, each of the cam contact surfaces 341 has an inclined surface portion 3411 that is tilted downwardly from the initial end to the terminal end, and a stopping surface 3412 that is adjacent to the terminal end of the cam contact surface 341 and connected to the inclined surface portion 3411.

As shown in FIG. 10, the inclined surface portion 3411 of the cam contact surface 341 is tilted downwardly from the initial end to the terminal end, and the stopping surface 3412 is connected to a terminal end of the inclined surface portion 3411. As such, when the corresponding second radial positioning portion 212 is engaged with the corresponding first radial positioning portion 123, the cam contact surface 341 has a minimum pitch between an initial end of the inclined surface portion 3411 and a corresponding position on a top surface of the second radial positioning portion 212. Furthermore, a distance between any point on the stopping surface 3412 and a corresponding position on the top surface of the second radial positioning portion 212 is greater than a distance between the initial end of the cam contact surface 341 and a corresponding position on the top surface of the second radial positioning portion 212.

In the present embodiment, when the second radial positioning portion 212 is engaged with the corresponding first radial positioning portion 123, a distance between upper edges of the two lateral protrusions 333 of the rotational locking member 330 and a bottom surface of the press-contact portion 334 is configured to be equal to or less than the distance between any point on the stopping surface of any of the cam contact surfaces 341 and the corresponding position on the top surface of the corresponding second radial positioning portion 212.

Therefore, after the rotational shaft 331 of the rotational locking member 330 and the two lateral protrusions 333 pass through the second locking hole 214 and the first locking hole 125, and the operator rotates the rotational locking member 330 such that the two lateral protrusions 333 are displaced to the stopping surfaces 3412 (as shown in FIG. 10), the bottom surface of the press-contact portion 334 and the upper edges of the two lateral protrusions 333 respectively and tightly abut against the top surface of the second radial positioning portion 212 and the corresponding stopping surfaces 3412, so as to prevent a relative displacement between the second radial positioning portion 212 and the corresponding first radial positioning portion 123 along the vertical axis direction D3. In this way, the purpose of locking the second radial positioning portion 212 and the first radial positioning portion 123 can be achieved.

Moreover, in the present embodiment, the locking seat 340 is configured to include a blocking protrusion 3413 that is disposed at the terminal end of each of the cam contact surfaces 341 and protrudes from the stopping surface 3412, and a retention protrusion 3414 is disposed on the stopping surface 3412 away from the blocking protrusion 3413 and protrudes from the stopping surface 3412. When the operator rotates the rotational locking member 330 such that the two lateral protrusions 333 of the rotational locking member 330 are moved to the corresponding stopping surfaces 3412, each of the lateral protrusions 333 can be engaged with the stopping surface 3412 at a position between the blocking protrusion 3413 and the retention protrusion 3414. Due to a front edge and a back edge of the lateral protrusion 333 being respectively engaged with the blocking protrusion 3413 and the retention protrusion 3414, the lateral protrusion 333 is positioned on the stopping surface 3412, thereby ensuring a locked state of the locking assembly 300.

As shown in FIG. 8, in the anti-separation assembly 400 of the present embodiment, a through hole 421 is formed on the connection plate 420 and corresponds in position to the rotational locking member 330, and the through hole 421 allows the rotational locking member 330 to penetrate through the connection plate 420. In addition, a plurality of indicators 422 can be disposed in an area surrounding the through hole 421 on a top surface of the connection plate 420, and are used to indicate degrees of rotation where the rotational locking member 330 is in the locked state or an unlocked state. Accordingly, an operational convenience can be improved.

By virtue of the locking assembly 300 of the present embodiment, the operator can use their hands to directly insert the rotational locking member 330 into the first locking hole 125 and the second locking hole 214 that correspond to each other, and rotate the rotational locking member 330 for fixing the rotational locking member 330 to the corresponding locking seat 340. During this process, no specific tool is required, so that a tool-free and speedy assembly can be achieved.

Beneficial Effects of the Embodiments

In conclusion, in the ceiling fan blade assembly structure 1 provided by the present disclosure, by virtue of "each of the fan blade assembly portions 120 including the two first side plates 122, the first radial positioning portion 123, and the two first vertical positioning portions 124 disposed on the two first side plates 122," "each of the fan blades 200 having the fan blade connection portion 210, and the fan blade connection portion 210 including the two second side plates 211 that cooperate with the two first side plates 122, the second radial positioning portion 212 that cooperates with the first radial positioning portion 123, and the two second vertical positioning portions 213 that cooperate with the two first vertical positioning portions 124," and "the locking assembly 300 being used for locking together the first radial positioning portion 123 and the second radial positioning portion 212 that correspond to each other," the fan blade connection portion 210 of the fan blade 200 can be easily and preliminarily fixed to the corresponding fan blade assembly portion 120 before the first radial positioning portion 123 and the second radial positioning portion 212 that correspond to each other are locked together through the locking assembly 300.

Through the above-mentioned technical features, when assembling a ceiling fan having the ceiling fan blade assembly structure 1 of the present disclosure, the operator can first engage the fan blade connection portion 210 of each of the fan blades 200 with the corresponding fan blade assembly portion 120 in a top-to-down manner, so that the fan blades 200 can be preliminarily fixed to the blade holder 100 without dropping. Then, without assistance from others, the operator can tightly lock the locking assembly 300 with the corresponding fan blade connection portion 210 and the corresponding fan blade assembly portion 120. In this way, an effect of quickly and easily assembling the fan blades 200 to the blade holder 100 with improved safety can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A ceiling fan blade assembly structure, comprising:

a blade holder, wherein the blade holder includes a holder body and a plurality of fan blade assembly portions connected to an outer side of the holder body; wherein a longitudinal axis direction that is parallel to a radial direction of the blade holder, a horizontal axis direction that is parallel to an orthogonal projection plane of the plurality of fan blade assembly portions and perpendicular to the longitudinal axis direction, and a vertical axis direction that is perpendicular to the orthogonal projection plane of the plurality of fan blade assembly portions are defined by each of the plurality of fan blade assembly portions; wherein each of the plurality of fan blade assembly portions includes two first side plates that are parallel to the longitudinal axis direction and extend toward a top of the fan blade assembly portion, a first radial positioning portion disposed between the two first side plates, and two first vertical positioning portions disposed on the two first side plates;

a plurality of fan blades corresponding in quantity to the plurality of fan blade assembly portions, wherein each of the plurality of fan blades has a fan blade connection portion disposed at a first end of the fan blade and a blade that is connected to the fan blade connection portion and extends toward a second end of the fan blade, and the first end is opposite to the second end; wherein each of the fan blade connection portions includes two second side plates that cooperate with the two first side plates, a second radial positioning portion, and two second vertical positioning portions; wherein the second radial positioning portion is disposed on a bottom side of the fan blade connection portion, corresponds in position to the first radial positioning portion, and is complementary in shape to the first radial positioning portion; wherein the two second vertical positioning portions correspond in position to and are engageable with the two first vertical positioning portions, respectively; and a plurality of locking assemblies;

wherein the fan blade connection portions are configured to be assembled to the plurality of fan blade assembly portions by having the bottom side of the fan blade connection portion oriented toward the plurality of fan blade assembly portions, so that the two second side plates of the fan blade connection portion are located at inner sides of the two first side plates, and the second radial positioning portion is engaged with the first radial positioning portion; wherein the two second vertical positioning portions are engageable with the two first vertical positioning portions respectively, so that the fan blade connection portion is unable to be displaced away from the fan blade assembly portion along the vertical axis direction;

wherein the first radial positioning portion has at least one first locking hole, and the second radial positioning portion has at least one second locking hole that corresponds in position to the at least one first locking hole; wherein, after the second radial positioning portion and the first radial positioning portion are assembled, the locking assembly is configured to be locked into the at least one second locking hole and the at least one first locking hole, so as to prevent separation of the second radial positioning portion from the first radial positioning portion.

2. The ceiling fan blade assembly structure according to claim 1, wherein each of the plurality of fan blade assembly portions further includes a base plate connected to bottom ends of the two first side plates; wherein, when the fan blade connection portion is assembled to the plurality of fan blade assembly portions, the bottom side of the fan blade connection portion abuts against a top surface of the base plate.

3. The ceiling fan blade assembly structure according to claim 2, wherein the first radial positioning portion is a protruding structure that protrudes from the base plate, and the second radial positioning portion has a groove that is complementary in shape to the first radial positioning portion.

4. The ceiling fan blade assembly structure according to claim 3, wherein the first radial positioning portion has a top wall that is parallel to the base plate and a plurality of side walls connected between an outer periphery of the top wall and the base plate; wherein, on the orthogonal projection plane of the plurality of fan blade assembly portions, a contour shape of an end of the first radial positioning portion relative to the base plate is smaller than a contour shape of a bottom end of the first radial positioning portion.

5. The ceiling fan blade assembly structure according to claim 4, wherein a length of the first radial positioning portion along the longitudinal axis direction is less than a width of the first radial positioning portion along the horizontal axis direction.

6. The ceiling fan blade assembly structure according to claim 5, wherein the width of the first radial positioning portion along the horizontal axis direction ranges between one-third and three-fourths of a width of the base plate along the horizontal axis direction, and the length of the first radial positioning portion along the longitudinal axis direction is not less than one-fourth of the width of the first radial positioning portion along the horizontal axis direction.

7. The ceiling fan blade assembly structure according to claim 2, wherein the two first vertical positioning portions of each of the plurality of fan blade assembly portions have two first openings respectively formed on the two first side plates, and an upper edge is formed above each of the two first openings; wherein the two second vertical positioning portions of each of the plurality of fan blade connection portions each include a first elastic sheet and a first hook disposed on a side surface of the first elastic sheet that faces toward the two first side plates; wherein, when the plurality of fan blade connection portions are assembled to the plurality of fan blade assembly portions respectively, the two first elastic sheets are configured to be adjacent to the two first side plates respectively, and the two first hooks are capable of being fitted into the two first openings respectively and are engaged with the upper edge of the two first openings respectively.

8. The ceiling fan blade assembly structure according to claim 7, wherein, when any of the fan blade connection portions is assembled to one of the plurality of fan blade assembly portions, the two second vertical positioning portions of each of the plurality of fan blade connection portion are located at inner sides of the two first openings; wherein a first actuation portion is formed at an upper end of each of the first elastic sheets of the two second vertical positioning portions, and the first actuation portions are provided for an operator to actuate and move the two first elastic sheets in a direction away from the first openings.

9. The ceiling fan blade assembly structure according to claim 4, wherein the locking assembly includes at least one internal screw thread and at least one screw, the at least one internal screw thread has an opening that corresponds to the at least one first locking hole, and the at least one screw is capable of passing through the at least one second locking hole and the at least one first locking hole that correspond to each other and cooperates with the at least one internal screw thread; wherein the at least one screw passes through the at least one second locking hole and the at least one first locking hole that correspond to each other, and is locked into the at least one internal screw thread, so that the second radial positioning portion is locked to the first radial positioning portion.

10. The ceiling fan blade assembly structure according to claim 4, wherein the locking assembly includes:

at least one rotational locking member and at least one locking seat, wherein the at least one locking seat is disposed on a bottom side of the first radial positioning portion and corresponds in position to the at least one first locking hole, and the at least one first locking hole penetrates through the at least one locking seat;

wherein the at least one rotational locking member includes a rotational shaft, a twist portion disposed at a top end of the rotational shaft, at least two lateral protrusions that are disposed at an outer side of a bottom end of the rotational shaft and extend in a direction away from a center of the rotational shaft, and a press-contact portion disposed below the twist portion;

wherein apertures of the at least one first locking hole and the at least one second locking hole match with a diameter of the rotational shaft, and at least two slots that correspond in shape to the at least two lateral protrusions are formed on outer sides of each of the at least one first locking hole and the at least one second locking hole that correspond to each other; wherein, when the at least two lateral protrusions are aligned with the at least two slots of the at least one first locking hole and the at least two slots of the at least one second locking hole that correspond to each other, the at least one rotational locking member is capable of passing through the at least one first locking hole and the at least one second locking hole that correspond to each other;

wherein the at least one locking seat has a bottom portion, and the bottom portion of the at least one locking seat is configured to have at least two cam contact surfaces that correspond in quantity to the at least two lateral protrusions; wherein an initial end and a terminal end that is opposite to the initial end are defined on each of the at least two cam contact surfaces, the initial end of each of the at least two cam contact surfaces is adjacent to one of the at least two slots of the at least one first locking hole, and the terminal end of each of the at least two cam contact surfaces is adjacent to another one of the at least two slots of the at least one first locking hole;

wherein each of the at least two cam contact surfaces has a stopping surface that is adjacent to the terminal end and an inclined surface portion that connects the initial end and the stopping surface, and the inclined surface portion of each of the at least two cam contact surfaces is an inclined surface that is tilted downwardly from the initial end to the terminal end;

wherein, when the second radial positioning portion is engaged with the first radial positioning portion, a distance between upper edges of the at least two lateral protrusions of the at least one rotational locking member and a bottom surface of the press-contact portion is configured to be equal to or less than a distance between any point on the stopping surface of any of the at least two cam contact surfaces and a corresponding position on a top surface of the second radial positioning portion; wherein, after the rotational shaft of the at least one rotational locking member and the at least two lateral protrusions pass through the at least one second locking hole and the at least one first locking hole that correspond to each other, and an operator rotates the at least one rotational locking member such that the at least two lateral protrusions are displaced to the stopping surface, the bottom surface of the press-contact portion and the upper edges of the at least two lateral protrusions respectively abut against the top surface of the second radial positioning portion and the stopping surface, so as to prevent a relative displacement between the second radial positioning portion and the first radial positioning portion along the vertical axis direction.

11. The ceiling fan blade assembly structure according to claim 10, wherein the at least one locking seat is configured to include a blocking protrusion that is disposed at the terminal end of each of the at least two cam contact surfaces and protrudes from the stopping surface, and a retention protrusion is disposed on the stopping surface away from the blocking protrusion and protrudes from the stopping surface; wherein any of the at least two lateral protrusions of the at least one rotational locking member is engageable with the stopping surface at a position between the blocking protrusion and the retention protrusion, so as to be positioned on the stopping surface.

12. The ceiling fan blade assembly structure according to claim 8, wherein a side surface of each of the two second vertical positioning portions of the fan blade connection portion relative to the two first side plates is defined as a back surface, and the fan blade connection portion further includes two third side plates that are disposed at inner sides of the back surfaces of the two second vertical positioning portions and spaced apart from the two second side plates; wherein two second openings are respectively formed on the two third side plates, and an upper edge is formed above each of the two second openings; wherein an anti-separation assembly is further arranged on each of the fan blade connection portions such that the fan blade connection portion is not separated from the plurality of fan blade assembly portions, each of the anti-separation assemblies includes two insertion members that are able to be inserted between the two second vertical positioning portions and the two third side plates, and each of the two insertion members includes a blocking element that abuts against the back surface of the two second vertical positioning portions and a retention member that is adjacent to the third side plate and corresponds in position to the two second openings; wherein each of the retention members includes a second elastic sheet, a second hook is disposed on a side of the second elastic sheet that faces toward the second opening, and the second hook protrudes toward the second opening; wherein, when the insertion member is inserted into a gap between the second side plate and the third side plate that correspond to each other, the blocking element of the insertion member is configured to abut against a back surface of the first elastic sheet of the second vertical positioning portion, so as to prevent the first elastic sheet from being displaced in the direction away from the first opening; wherein the second hook of the second elastic sheet is capable of being fitted into the second opening, and is engaged with the upper edge of the second opening, so as to prevent an upward displacement of the insertion member; wherein a second actuation portion is further formed at an upper end of each of the two second elastic sheets for the operator to actuate the second elastic sheet.

13. The ceiling fan blade assembly structure according to claim 12, wherein the anti-separation assembly further includes a connection plate connected between the two insertion members; wherein, when each of the two insertion members is inserted into the gap between the second side plate and the third side plate that correspond to each other, the connection plate is located above the fan blade connection portion.

* * * * *